W. J. HERRICK.
GEARING.
APPLICATION FILED APR. 2, 1909.
1,043,931.
Patented Nov. 12, 1912.
2 SHEETS—SHEET 1.
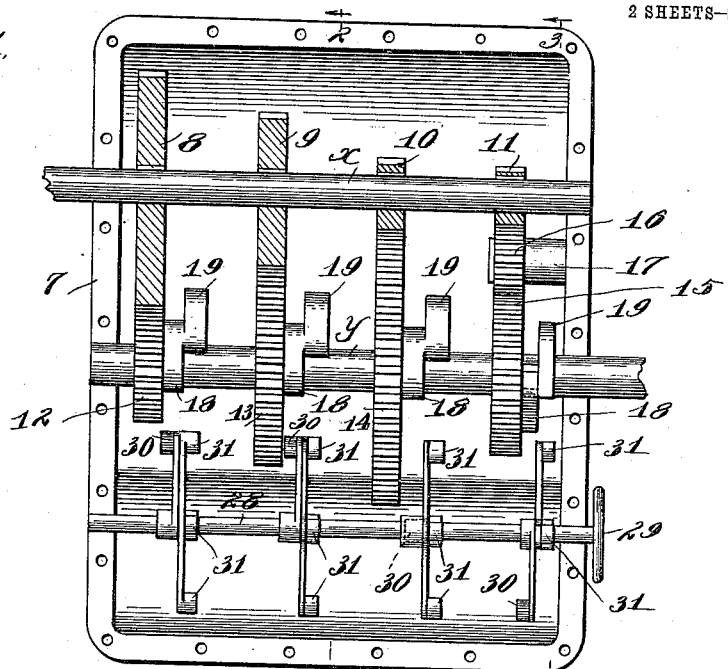
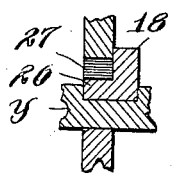
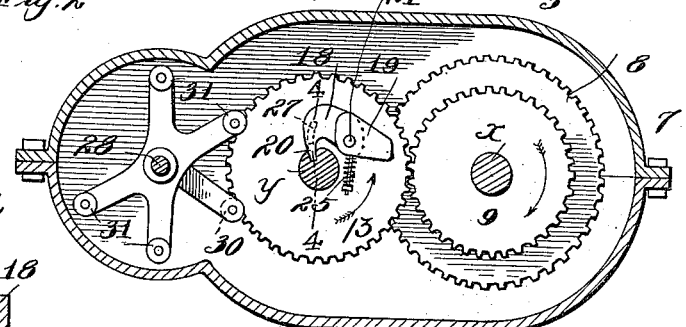
Witnesses:
Inventor.
W. J. Herrick
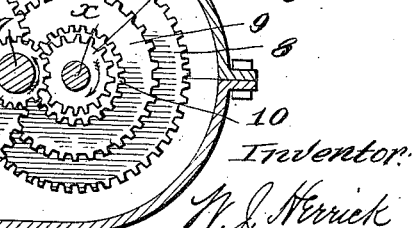

W. J. HERRICK.
GEARING.
APPLICATION FILED APR. 2, 1909.
1,043,931.
Patented Nov. 12, 1912.
2 SHEETS—SHEET 2.
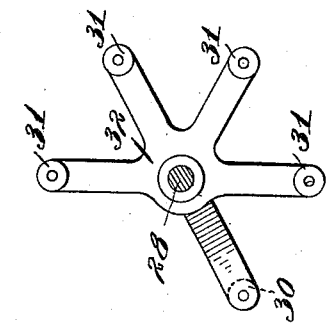
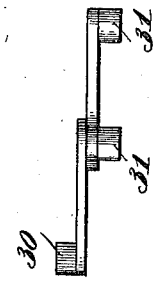
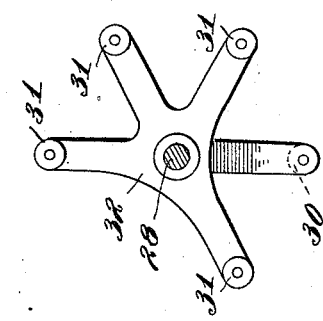
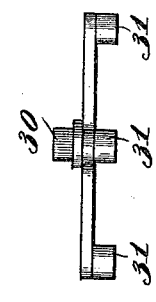
Fig. 5.
Fig. 6.
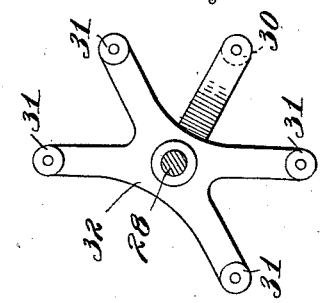
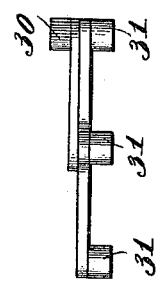
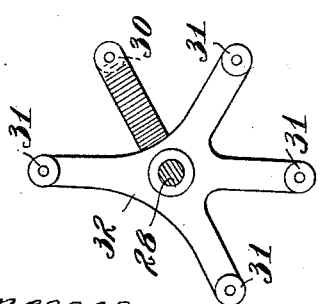
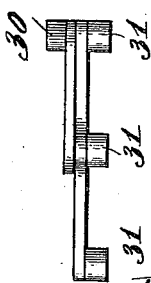

UNITED STATES PATENT OFFICE.

WILLIAM J. HERRICK, OF CHICAGO, ILLINOIS.

GEARING.

1,043,931.  Specification of Letters Patent.  Patented Nov. 12, 1912.

Application filed April 2, 1909. Serial No. 487,401.

*To all whom it may concern:*

Be it known that I, WILLIAM J. HERRICK, a citizen of the United States, residing at Chicago, in the county of Cook and State of Illinois, have invented certain new and useful Improvements in Gearing, of which the following is a specification, reference being had therein to the accompanying drawing.

This invention relates to mechanism for transmitting motive power from any prime motor or source of power to machines such for example as motor-vehicles, launches, machinery or other devices whereby the driven part may be propelled in the same or in a reverse direction from that of the driver and at different speeds.

The invention consists in the novel arrangements and organizations of parts now about to be described and as pointed out in the appended claims.

In the accompanying drawings, Figure 1 is a top plan view showing a practical embodiment of my invention; Fig. 2 is a sectional view on the line 2—2 of Fig. 1; Fig. 3 is a sectional view on the line 3—3 of Fig. 1; Fig. 4 is a sectional view of a detail taken on the line 4—4 of Fig. 2; Fig. 5 is a view of a series or bank of selective devices, each shown in elevation, and Fig. 6 is a top plan view of the parts of Fig. 5.

In carrying out my invention I support two shafts $x$ and $y$ in suitable bearings in a case 7 preferably of ordinary sectional form and filled with oil so that the shafts and their gears are immersed and run in oil. The shaft $x$ is driven in the direction of the feathered arrow in Figs. 2 and 3 by any engine or other prime motor or source of power, and the shaft $y$ is connected with the machine or device to which the motion or power is to be transmitted. On the shaft $x$ I rigidly mount a series or bank of keyed gears 8, 9, 10 and 11 of diverse sizes, although the gear 11 may be of the same size as one of the others if desired, and on the shaft $y$ I loosely mount an opposite series or bank of gears 12, 13, 14 and 15 of diverse size; the gears 12, 13 and 14 mesh with the gears 8, 9 and 10 respectively, and the gear 15 is driven from the gear 11 by means of an interposed idle gear 16 loosely mounted on a stub shaft 17 so as to revolve in a direction opposite to the direction of the other loose gears. In the drawings I have shown four gears on each shaft, whereby I provide for three different speeds forward or in one direction and one speed in reverse direction, it of course being understood that the number may be varied for either direction of movement and the sizes to suit the desired variations of speed.

The mechanism for connecting and disconnecting the loose gears and the driven shaft $y$ comprises a latch mounted on each of the loose gears and adapted to lock and unlock with the shaft. Each latch is pivoted on one side of its associated loose gear, and comprises an oppositely extending pair of wings 18 and 19 which are offset from each other or located in different planes as shown in Fig. 1. The wing 18 is provided with a toe 20 adapted to enter a groove or key-way in the shaft $y$ as shown in Figs. 2 and 4. The latches for the forward gears 12, 13 and 14 are uniform in construction, and that for the reverse gear 15 is similar to them in operation and function but differs somewhat from them in its details owing to the fact that it operates in a reverse direction. In the latches for the forward gears the wings are in a single piece pivoted thereto at 21, and in the latch for the reverse gear the wings are separate pieces pivoted to the gear at 22 and 23 but connected together by a pin or lug on one end of the wing 19 taking into a recess or slot 24 in the adjacent end of the wing 18, as shown in Fig. 4. Each latch is provided with a spring 25 connected to the associated gear at one end and to its latch at the other end in the line of its pivot so that the spring holds the latch off the center of its pivot on either side in which it may be set. The shaft $y$ preferably is slightly cut away at the side of the groove at which the latch approaches so that the latter will more easily and certainly latch into the groove, this detail being shown in Figs. 2 and 3. If the latch of one of the forward gears, as shown in connection with the gear 13 in Fig. 2 for example, engages the groove in the shaft $y$, the gear and shaft revolve together in the direction of the featherless arrow of that figure, and this coöperation drives the shaft $y$ and its associated machine in a forward direction at a speed dependent upon the relative size of gears 9 and 13 at any predetermined engine speed. The latch is held in its locked or projected position by the camming effect or action of its rearwardly beveled or inclined face pressing against the front wall of the groove which tends to force the latch home in the groove, and the expansive action of its spring 25 on the latch outside of its pivot supplements the locking action due to the shape of the latch itself. This relation exists until the latch is turned on its pivot to lift its toe out of the groove, and when so retracted or released the expansive action of its spring is shifted to the inside of the pivot 21 and holds the latch in unlatched position so that the gear 13 will rotate freely on the shaft and without communicating motion to it. These rotations and operations are typical of all the forward gears 12, 13 and 14. When the latch of the gear 15 is unlatched this gear revolves independently of shaft $y$, and the expansive action of its spring outside the pivot 22 holds the latch out of engagement, but when the latch is shifted to engage its toe in the groove of the shaft it is held in latched position in the same manner as the others and drives the shaft and its associated machine in a reverse direction at a speed dependent upon the relative size of the reverse gears.

In order to cause the latch to act on the principle of a key or spline between its gear and the shaft $y$, I extend the groove in the shaft to a point more or less within the area of the gear and provide the toe of the latch with a lateral projection 26 forming a key-portion in this extension as shown in Fig. 4. When this construction is employed the gear is of course cut away at the shaft sufficiently to provide a recess 27 into which the projection partly extends when the latch is in the groove by reason of the toe being somewhat higher than the depth of the groove, and into which the toe is retracted to allow it to clear the shaft when the latch is retracted or unlatched. By this means the latch acts as a key or spline to engage the shaft and gear, the strain being taken by the projection or key-portion of the latch and so removed entirely from the body of the latch itself and from its pivot, and the force or strain of the gear being delivered directly upon the shaft itself by the simplest and strongest connection available in the mechanic arts.

Means are provided for automatically projecting and retracting the latches into and out of engagement with the driven shaft $y$ to couple and uncouple the shaft and loose gears. The wings 18 and 19 revolve with their associated gear and travel in parallel planes; the wing 18 is the coupling wing as it is tripped to project the latch into engagement with the shaft, and the wing 19 is the uncoupling wing as it is tripped to retract the latch to disengage the toe from the groove.

Any suitable selective means may be employed to trip the latches; for example, I mount a revoluble rod 28 in the case which may be manipulated or operated by any suitable means coöperating with it, as through the medium of its operating disk 29. The rod is provided with a series of sets of projections preferably in the form of rigid radial arms preferably provided with anti-friction rollers at their ends. Each set comprises one more arm than there are sets of gears, and the rollers of each set project into the path or plane of rotation of their associated latches, one arm 30 of each set coöperating with the wing 18 of a latch, and the other four arms 31 of each set coöperating with the wing 19 of the same latch. The arrangement is such that when the coupling arm 30 of any given set is projected into the plane of rotation of an associated latch it will cam or force the latch into locked or projected position in the groove of the shaft, and when the other arms of that set are so projected they will cam or force the latch back to retracted or unlatched position, and when any coupling arm engages its associated coupling wing 18, an uncoupling arm of each of the other sets engages an associated uncoupling wing on its gear. This is illustrated in Figs. 5 and 6, a coupling projection such as an arm 30 for each coupling wing of each latch is associated with four projections or arms 31 for the uncoupling wing of the same latch, the coupling arm 30 of each set being in a different plane from its associated uncoupling arms 31 to correspond with the arrangement of the wings in this respect, the uncoupling arms of each set being shown connected by a web 32 for convenience of illustration. The coupling arms are arranged in succession or are suitably spaced apart around the shaft, and the uncoupling arms of the several sets are arranged in a plane different from arms 30 but in the same axial lines or longitudinal planes with each other and so that there are four uncoupling arms in one line for throwing out all latches simultaneously to provide a neutral point and three uncoupling arms in each other line to throw out the other three latches when any one latch is coupled to its gear. For example, in the disposition shown in Fig. 5 which illustrates the neutral point or when all gears are uncoupled from shaft $y$, the top set of arms 31 is alined and so an uncoupling arm projects into the path of each wing 19 of all the latches to uncouple all the gears of shaft $y$; when the trip-rod 28 is turned to the next point toward the left to bring the coupling arm 30 of the left-hand set of Fig. 5 to the top for example, this arm is projected to trip its associated latch to lock its gear to the shaft, while an uncoupling arm 31 on all the other sets is projected into the paths of the other wings 19 to force their latches into uncoupled position, and when the trip-rod is turned to the next point to bring the coupling arm 30 of the next set of Fig. 5 reading toward the right to the top, this arm will trip its associated latch to lock its gear to the shaft while an uncoupling arm 31 on all the other sets will keep their latches in uncoupled position, these operations holding true and being the same as the trip-rod is turned to bring either of the other two coupling arms 30 to the top position. By this means any gear may be selected, and disengagement of the other gears is insured. The specific application of the selective operation is illustrated in Fig. 2 with one of the forward gears, and in Fig. 3 with the reverse gear. In the former instance, the arm 30 of the associated set coöperates with the wing 18 of the latch for the gear 13, and the arms 31 of that set coöperate with the wing 19 of that latch, thereby projecting or retracting this latch as the case may be to couple and uncouple the gear 13 and shaft $y$; and in Fig. 3 the arms 30 and 31 coöperate with the latch of the reverse gear 15 to couple and uncouple it to the shaft through the wings 18 and 19, the associated springs 25 holding the latch in either position until the latter is moved over its center by one of its arms. By this arrangement the latches and their coöperating projecting and retracting arms provide a selective device to determine that none of the gears shall operate the driven shaft or which pair of coöperating gears shall move it, and by appropriately turning the trip-rod 28 all of the gears may be made neutral to the driven shaft or any of the several gears may be selected to move the shaft.

The loose gears are suitably held from the longitudinal movement on shaft $y$ by any convenient means now well known for that purpose.

Changes in form and in all minor details may of course be made without departing from the scope of my invention.

Having described my invention, I claim:—

1. In a device of the class described, a rotating member, a bank of diversely sized gears rotating therewith, an opposite bank of diversely sized gears driven from the first gears, a shaft on which the second gears are loosely mounted, a latch pivoted on each loose gear and having wings in different planes, and a selective trip to alternately trip the wings of any latch to couple and uncouple the selected latch and shaft.

2. In a device of the class described, a driving shaft, a driven shaft, a bank of gears of different sizes on the driving shaft, an opposite bank of gears of different sizes loose on the driven shaft and driven from the first gears, an idler to rotate one of the loose gears in a direction opposite to the others, a latch pivoted on each gear and having wings in different planes, and a selective trip to alternately trip the wings of any latch to couple and uncouple the selected latch and shaft.

3. In a device of the class described, a rotating shaft, a bank of diversely sized gears rotating therewith, an opposite bank of diversely sized gears driven from the first gears, a shaft on which the second gears are loosely mounted, a latch pivoted on each loose gear and having oppositely extending wings in different planes, a selective trip to alternately trip the wings of any latch to couple and uncouple the latch and shaft, and means to hold the selected latch in either position.

4. In a device of the class described, a driving shaft, a driven shaft, a bank of gears of different sizes on the driving shaft, an opposite bank of gears of different sizes loose on the driven shaft and driven from the first gears, an idler to rotate one of the loose gears in a direction opposite to the others, a latch pivoted on each gear and having wings in different planes, a selective trip to alternately trip the wings of any latch to couple and uncouple the selected latch and shaft, and a spring to hold the latch in its coupled and uncoupled position.

5. In a device of the class described, a rotating shaft, a bank of diversely sized gears rotating therewith, an opposite bank of diversely sized gears driven from the first gears, a shaft on which the second gears are loosely mounted, a latch pivoted on each loose gear and having a pair of oppositely extending wings rotating in parallel planes, and a selective trip to couple and uncouple the latches and shaft.

6. In a device of the class described, a driving shaft, a driven shaft, a bank of gears of different sizes on the driving shaft, an opposite bank of gears of different sizes loose on the driven shaft and driven from the first gears, an idler to rotate one of the loose gears in a direction opposite to the others, a latch pivoted on each gear and having wings in different planes, and a member having projections to couple and uncouple each latch and shaft.

7. In a device of the class described, a rotating shaft, a bank of diversely sized gears rotating therewith, an opposite bank of diversely sized gears driven from the first gears, a shaft on which the second gears are loosely mounted, a pivoted latch on each loose gear, and a member having arms to couple and uncouple each latch with the shaft.

8. In a device of the class described, a rotating shaft, a bank of diversely sized gears rotating therewith, an opposite bank of diversely sized gears driven from the first gears, a shaft on which the second gears are loosely mounted, a latch on each loose gear having wings to project and retract the same to lock and unlock it with the shaft, and a member provided with a plurality of sets of arms arranged at intervals in the arc of a circle in corresponding relation to the latches, each set coupling and uncoupling its latch and the shaft when the rod is appropriately moved.

9. In a device of the class described, a driving shaft, a driven shaft, a bank of gears of different sizes on the driving shaft, an opposite bank of gears of different sizes loose on the driven shaft and driven from the first gears, an idler to rotate one of the loose gears in a direction opposite to the others, a reversible latch on each loose gear, and a member provided with projections for each latch to couple and uncouple the latch and shaft.

10. In a device of the class described, a driving shaft, a driven shaft, a bank of gears of different sizes on the driving shaft, an opposite bank of gears of different sizes loose on the driven shaft and driven from the first gears, an idler to rotate one of the loose gears in a direction opposite to the others, a latch on each loose gear, having wings to project and retract the same to lock it with the shaft and to unlock it, and a rod provided with a plurality of sets of arms arranged at intervals in the arc of a circle in corresponding relation to the latches, each set coupling and uncoupling its latch and the shaft when the rod is appropriately moved.

In testimony whereof I affix my signature in presence of two witnesses.

WILLIAM J. HERRICK.

Witnesses:
GEORGE R. HARBAUGH,
J. McROBERTS.

---

Copies of this patent may be obtained for five cents each, by addressing the "Commissioner of Patents, Washington, D. C."